United States Patent
Kobayashi et al.

(10) Patent No.: US 7,745,770 B2
(45) Date of Patent: Jun. 29, 2010

(54) LIGHT INTENSITY CONTROLLER AND OPTICAL PICKUP DEVICE

(75) Inventors: Yasushi Kobayashi, Osaka (JP); Masatoshi Yajima, Osaka (JP); Akihiro Sakaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 341 days.

(21) Appl. No.: 12/064,835

(22) PCT Filed: Aug. 9, 2006

(86) PCT No.: PCT/JP2006/315753
§ 371 (c)(1),
(2), (4) Date: Feb. 26, 2008

(87) PCT Pub. No.: WO2007/026518
PCT Pub. Date: Mar. 8, 2007

(65) Prior Publication Data
US 2009/0261234 A1 Oct. 22, 2009

(30) Foreign Application Priority Data
Aug. 30, 2005 (JP) .............................. 2005-248979

(51) Int. Cl.
*G01J 1/32* (2006.01)
(52) U.S. Cl. ................. 250/205; 250/225; 359/483
(58) Field of Classification Search ............. 250/201.5, 250/205, 225; 369/110.02, 110.03, 110.04, 369/112.16, 112.17; 359/483, 494, 495
See application file for complete search history.

(56) References Cited
U.S. PATENT DOCUMENTS
6,980,505 B2 * 12/2005 Katayama et al. ...... 369/112.17

2002/0044577 A1 4/2002 Yanagawa et al.
(Continued)

FOREIGN PATENT DOCUMENTS
EP 1172808 A2 1/2002
(Continued)

OTHER PUBLICATIONS
European Search Report for corresponding European application 06782569.5 issued Dec. 23, 2009.
(Continued)

*Primary Examiner*—Thanh X Luu
*Assistant Examiner*—Francis M Legasse, Jr.
(74) *Attorney, Agent, or Firm*—Renner, Otto, Boisselle & Sklar, LLP

(57) ABSTRACT

A light intensity control device of the present invention includes a light source for outputting a plurality of types of light beams having different wavelengths; a light receiving section for receiving and converting the light beams into an electric signal in accordance with the intensity of the respective light beam; and a polarization separation section provided between the light source and the light receiving section. The plurality of types of light beams include a first light beam and a second light beam having a longer wavelength than that of the first light beam. The polarization separation section guides both a first polarization direction light component of the second light beam and a second polarization direction light component, perpendicular to the first polarization direction, of the second light beam to the light receiving section. The polarization separation section guides a first polarization direction light component of the first light beam to the light receiving section, and suppresses a second polarization direction component, perpendicular to the first polarization direction, of the first light beam from advancing to the light receiving section.

9 Claims, 9 Drawing Sheets

U.S. PATENT DOCUMENTS

| | | | |
|---|---|---|---|
| 2003/0099179 A1* | 5/2003 | Furuhata et al. | 369/53.26 |
| 2005/0087678 A1 | 4/2005 | Katayama | |
| 2005/0111516 A1 | 5/2005 | Hatano et al. | |
| 2005/0135220 A1* | 6/2005 | Katayama | 369/112.16 |

FOREIGN PATENT DOCUMENTS

| | | |
|---|---|---|
| JP | 06-96459 | 4/1994 |
| JP | 2002-109773 | 4/2002 |
| JP | 2003-132575 | 5/2003 |
| JP | 2003-141769 | 5/2003 |
| JP | 2004-110897 | 4/2004 |
| JP | 2004-133987 | 4/2004 |
| JP | 2005-141872 | 6/2005 |

OTHER PUBLICATIONS

International Search Report for corresponding Application No. PCT/JP2006/315753 dated Sep. 5, 2006.

Form PCT/ISA/237 and partial English Translation.

* cited by examiner

LIGHT INTENSITY CONTROLLER AND OPTICAL PICKUP DEVICE

TECHNICAL FIELD

The present invention relates to a light intensity control device for controlling the intensity of a light beam output by a light source, and an optical pickup apparatus including such a light intensity control device.

BACKGROUND ART

An optical pickup apparatus used for reading or writing information from or on an information layer of an optical disc medium includes a light intensity control device for monitoring a part of a laser beam output from a light source and controlling the light intensity thereof, such that the laser beam can be directed to the information layer of the optical disc medium at an appropriate light intensity.

FIG. 8 shows an optical pickup apparatus 400 disclosed in Patent Document 1. Referring to FIG. 8, an information medium 109 is a DVD (Digital Versatile Disc) or a CD (Compact Disc), and the optical pickup apparatus 400 records or reproduces information on or from the information medium 109.

The optical pickup apparatus 400 includes a DVD light source 101 for outputting a light beam 121 for DVDs having a wavelength of 650 nm, a CD light source 102 for outputting a light beam 122 for CDs having a wavelength of 780 nm, a beam splitter 103, a ½ waveplate 104, a polarizing beam splitter 105, a ¼ waveplate 106, a collimator lens 107, an objective lens 108, a sensor lens 110, a light detection section 111, and a light receiving element 112.

The beam splitter 103 transmits the entirety of a P-wave component and the entirety of an S-wave component of the light beam 121 for DVDs, and reflects the entirety of a P-wave component and the entirety of an S-wave component of the light beam 122 for CDs. The polarizing beam splitter 105 transmits the P-wave components of the light beams and reflects the S-wave components of the light beams. The light detection section 111 detects a tracking error signal, an information signal or the like from light reflected by the information medium 109. The light receiving element 112 outputs an electric signal to be fedback to a light source driving circuit (not shown) in accordance with the light intensity, and is referred to as the "front monitor".

An optical path for the light beam 122 for CDs is drawn as being offset from an optical path for the light beam 121 for DVDs, but is actually the same. The ½ waveplate 104 is located so as to receive light outside an effective luminous flux of the light beam 121 for DVDs and the light beam 122 for CDs.

Now, an operation of the optical pickup apparatus will be described. The light beam 121 for DVDs which is output by the light source 101 is transmitted through the beam splitter 103. Only the P-wave component of the effective luminous flux of the light beam 121 is selected by the polarizing beam splitter 105 and converted into circular polarization by the ¼ waveplate 106. The light beam 121 transmitted through the ¼ waveplate 106 passes through the collimator lens 107 and the objective lens 108, and then forms a light spot on the information layer of the DVD disc 109. The light reflected by the information layer is transmitted through the objective lens 108 and the collimator lens 107, is converted back into the P-wave component by the ¼ waveplate 106, is reflected by the polarizing beam splitter 105, and is guided to the sensor lens 110. The reflected light which is passed through the sensor lens 110 is received by the light detection section 111.

The light beam 122 for CDs which is output by the light source 102 is totally reflected by the beam splitter to be a light beam of the P-wave component. Like the light beam 121, the effective luminous flux of the light beam passes through the polarizing beam splitter 105, the ¼ waveplate 106, the collimator lens 107 and the objective lens 108, and then forms a light spot on the information layer of the CD disc 109. The light reflected by the information layer passes through the objective lens 108, the collimator lens 107, the ¼ waveplate 106, the polarizing beam splitter 105 and the sensor lens 110, and is received by the light detection section 111.

By contrast, the light outside the effective luminous flux of the light beam 121 for DVDs passes through the ½ waveplate 104 to be polarized to S-wave component light, is totally reflected by the polarizing beam splitter 105, and is received by the light receiving element 112. The light receiving element 112 outputs an electric signal in accordance with the light amount of the received light, and feeds the electric signal back to the light source driving circuit (not shown).

The light outside the effective luminous flux of the light beam 122 for CDs also passes through the ½ waveplate 104 to be polarized to S-wave component light, is totally reflected by the polarizing beam splitter 105, and is received by the light receiving element 112. The light receiving element 112 outputs an electric signal in accordance with the light amount of the received light, and feeds the electric signal back to the light source driving circuit.

As described above, the optical pickup apparatus 400 including the light sources 101 and 102 for independently outputting light beams of different wavelengths can change the polarization direction of the light beams independently. Therefore, the intensity of the light beam 121 for DVDs and the intensity of the light beam 122 for CDs can be controlled independently.

However, as recordable DVDs have become common and a higher recording speed of the optical disc apparatus has been demanded recently, the optical disc apparatus are desired to be stable against a temperature change. Also, the optical disc apparatus is strongly desired to be reduced in size. It has been proposed to adopt a single light source for outputting a plurality of types of light beams having different wavelengths in order to reduce the size of the optical disc apparatus.

However, where a single light source which accommodates an active layer for outputting a light beam for DVDs and an active layer for outputting a light beam for CDs in one package is adopted, a problem occurs that the polarization direction of each light beam cannot be independently changed unlike in the above-described structure. In addition, there is another problem that a temperature change, caused by the output of the light beam, changes the polarization ratio and the polarization angle of the light beams. As a result, the intensity of the light beam directed to the optical disc medium is changed. In order to solve the inability to freely change the polarization direction and prevent the intensity of the light beam from being changed, Patent Document 2 discloses an optical pickup apparatus which uses a polarization separation element for separating light intensity-controlling light (hereinafter, referred to as "monitoring light") into a P-wave component and an S-wave component and controls the light intensity for the light source with the P-wave component.

FIG. 9 shows a conventional optical pickup apparatus disclosed in Patent Document 2. A semiconductor laser element 201 includes two active layers 201a and 201b for outputting two light beams having different wavelengths. The first active layer 201a outputs a light beam 221 having a wavelength of 650 nm for DVDs (hereinafter, referred to as the "DVD wavelength"), and the second active layer 201b outputs a light beam 222 having a wavelength of 780 nm for CDs (hereinafter, referred to as the "CD wavelength").

The light beam 221 or 222 which is output from the semiconductor laser element 201 reaches a polarizing beam splitter (hereinafter, referred to as the "PBS") 206 as parallel light via a collimator lens 204. The PBS 206 transmits a majority (e.g., 90%) of the P-wave component of the light beam incident thereon, and reflects a part thereof (e.g., 10%) by a polarization separation face 206a. The PBS 206 also transmits a part (e.g., 10%) of the S-wave component of the light beam incident thereon, and transmits a majority thereof (e.g., 90%).

The light beam which is passed through the PBS 206 passes through a ¼ waveplate 209 to be converted into circular polarization, reaches an optical disc 211 via an objective lens 210, and is reflected by a recording face thereof. The light reflected by the recording face of the optical disc 211 returns to the PBS 206 via the objective lens 210 and the ¼ waveplate 209. The ¼ waveplate 209 converts the circular polarization of the reflected light beam into linear polarization. The PBS 206 reflects the light beam on the return path by the polarization separation face 206a, and the reflected light beam reaches a light receiving face of a light detector 213 via a light collection lens 205 and a multi-lens 212.

In a direction in which the light reflected by the PBS 206 is directed, another PBS 207 is provided. The PBS 207 is located in a direction in which the light beam incident from the collimator lens 204 and reflected by the PBS 206 is directed. On the PBS 207, such reflected light beam for front monitoring is incident. The PBS 207 passes approximately 100% of the P-wave component of the incident light beam, and reflects approximately 100% of the S-wave component of the incident light by a polarization separation face 207a. Almost 0% of the P-wave component is reflected by the PBS 207, and approximately 100% of the S-wave component passes through the PBS 207. In a direction in which the light passed through the PBS 207 is directed, a front monitor 208 is provided. Only the P-polarization component, which is passed through the PBS 207, is received by the front monitor 208. Thus, laser output power control is performed. In an optical pickup 500 using a light source accommodating two active layers for respectively outputting a light beam for DVDs and a light beam for CDs in one package, the P-wave component is used as the monitoring light for controlling the light intensity for the light source.

By adopting the P-wave component of the light beam output by the semiconductor laser element 201 as the monitoring light, the intensity of the light output by the semiconductor laser element 201 can be stably controlled.

Patent Document 1: Japanese Laid-Open Patent Publication No. 2004-110897

Patent Document 2: Japanese Laid-Open Patent Publication No. 2002-109773

DISCLOSURE OF THE INVENTION

Problems to be Solved by the Invention

However, in order to fulfill the demand for many types of recordable optical disc mediums including DVD-RAM, DVD-R, DVD+R, DVD-RW, DVD+RW, CD-R and CR-RW discs and also the demand for a higher recording speed, the light source is required to have a larger output. As a result, the following problem has now newly arisen. The optical pickup apparatus proposed by Patent Document 2 controls the intensity of the light output by the light source based only on the P-wave component. It has been found that the P-wave component is not sufficient to control the light intensity for, especially, CD-R or CD-RW discs. Specifically, in an optical pickup medium including a thick substrate and a small recording capacity such as a CD-R or CD-RW disc, the substrate has characteristics that the degree of birefringence of the light beam passing through the substrate is increased, and the degree of birefringence is changed within the plane of the disc. Due to such characteristics of the substrate, there is a problem that the ratio between the P-wave component and the S-wave component varies disc by disc. There is another problem that when the driving current for the light source is increased in order to raise the recording speed, the ratio between the P-wave component and the S-wave component varies in accordance with a temperature change of the light source. In the state where the ratio between the P-wave component and the S-wave component varies significantly, the light intensity cannot be sufficiently controlled based only on the P-wave component.

The present invention made in light of the above-described problems has an objective of providing a light intensity control device capable of stably controlling the intensity of the light beam even where the polarization angle or the polarization ratio is changed due to temperature characteristics of the light beam.

Means for Solving the Problems

A light intensity control device according to the present invention includes a light source for outputting a plurality of types of light beams having different wavelengths; a light receiving section for receiving the light beams and converting the light beams into an electric signal in accordance with an intensity of the respective light beam; and a polarization separation section provided between the light source and the light receiving section. The plurality of types of light beams include a first light beam and a second light beam having a longer wavelength than that of the first light beam; the polarization separation section guides both a light component in a first polarization direction of the second light beam and a light component in a second polarization direction, which is perpendicular to the first polarization direction, of the second light beam to the light receiving section; and the polarization separation section guides a light component in a first polarization direction of the first light beam to the light receiving section, and suppresses a light component in a second polarization direction, which is perpendicular to the first polarization direction, of the first light beam from advancing to the light receiving section.

According to one embodiment, the ratio of the light component in the first polarization direction of the second light beam guided by the polarization separation section to the light receiving section with respect to the entire light component in the first polarization direction of the second light beam, and the ratio of the light component in the second polarization direction of the second light beam guided by the polarization separation section to the light receiving section with respect to the entire light component in the second polarization direction of the second light beam, are the same.

According to one embodiment, the ratio of the light component in the second polarization direction of the first light beam guided by the polarization separation section to the light receiving section with respect to the entire light component in the second polarization direction of the first light beam, is lower than the ratio of the light component in the first polarization direction of the first light beam guided by the polarization separation section to the light receiving section with respect to the entire light component in the first polarization direction of the first light beam.

According to one embodiment, the second light beam has the longest wavelength among the plurality of types of light beams.

According to one embodiment, the light components in the first polarization direction are P-wave components, and the light components in the second polarization direction are S-wave components.

According to one embodiment, the light intensity control device further includes a light source for outputting a third light beam having a shorter wavelength than that of the first light beam. The polarization separation section guides a light component in a first polarization direction of the third light beam to the light receiving section, and suppresses a light component in a second polarization direction, which is perpendicular to the first polarization direction, of the third light beam from advancing to the light receiving section.

According to one embodiment, the light intensity control device further includes a control section for controlling the intensity of the light beam, which is to be output by the light source, in accordance with the electric signal output by the light receiving section.

An optical pickup apparatus according to the present invention includes the above-described light intensity control device; a light collection section for collecting the plurality of types of light beams to an information medium; another polarization separation section for separating the light beam output by the light source to light directed toward the light collection section and light directed to the polarization separation section; and another light receiving section for receiving the light reflected by the information layer and converting the reflected light into an electric signal in accordance with an intensity of the reflected light.

According to one embodiment, the optical pickup apparatus further includes another light source for outputting a third light beam having a shorter wavelength than that of the first light beam; and an optical element for guiding the first and second light beams output by the light source and the third light beam output by the another light source to the another polarization separation section. The polarization separation section guides a light component in a first polarization direction of the third light beam to the light receiving section and suppresses a light component in a second polarization direction, which is perpendicular to the first polarization direction, of the third light beam from advancing to the light receiving section.

Effects Of The Invention

According to the present invention, the light receiving section receives both a P-wave component and an S-wave component of a light beam which has a longer wavelength among the plurality of types of light beams. The light receiving section receives a P-wave component, but not an S-wave component, of the light beam which has a shorter wavelength. By controlling the light intensity using both the P-wave component and the S-wave component of a light beam for CDs (non-polarization optical system), and controlling the light intensity using only the P-wave component of a light beam for DVDs (polarization optical system), the intensity of the light beams can be controlled stably even when the polarization angle or the polarization ratio is changed due to temperature characteristics of the light source.

DESCRIPTION OF THE REFERENCE NUMERALS

Figure 1:
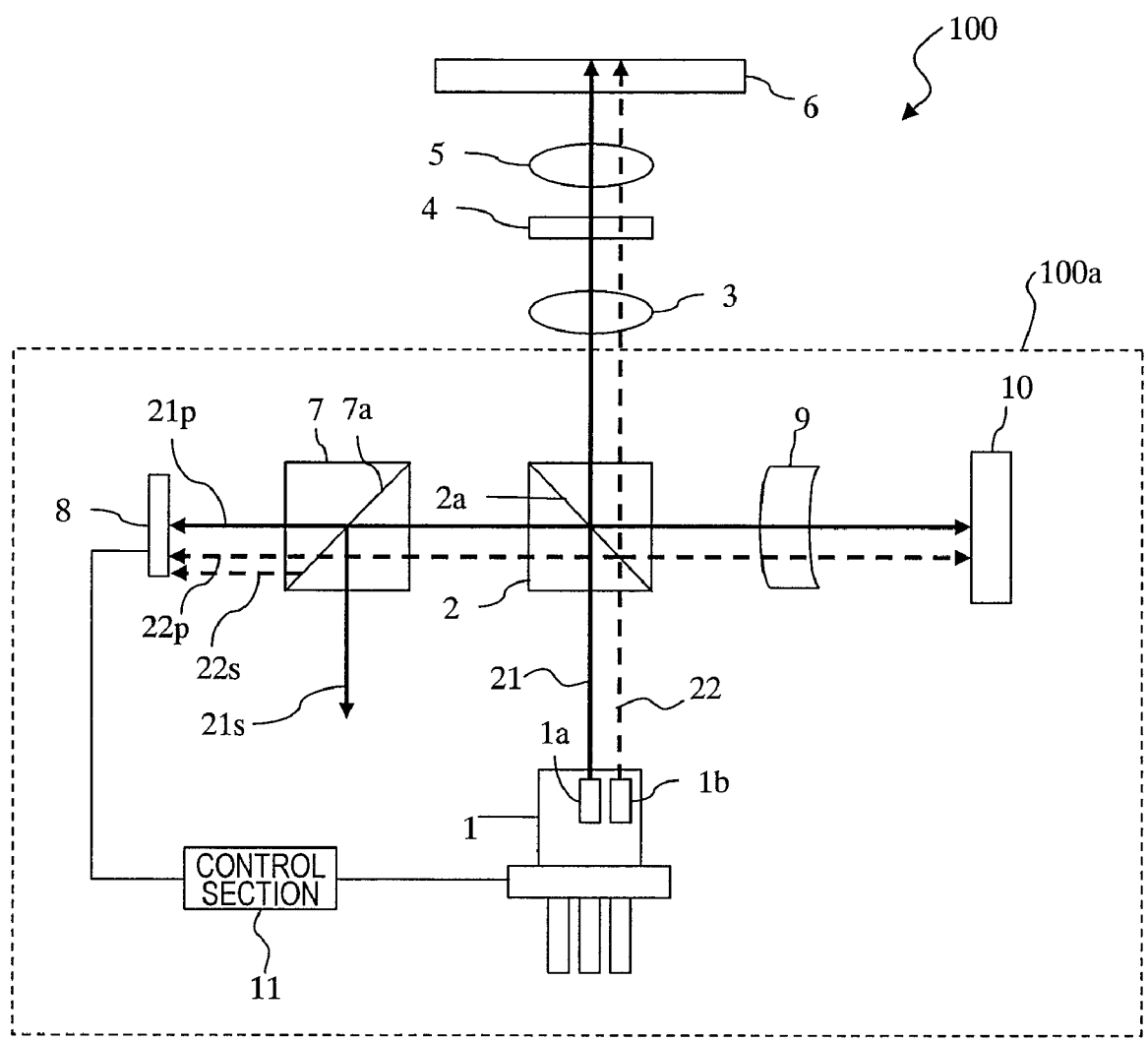
FIG. 1 shows an optical pickup apparatus according to an embodiment of the present invention.

1 Light source
1a First active layer
1b Second active layer
2 Polarizing beam splitter
4 ¼ waveplate
5 Objective lens
6 Information medium
7 Polarizing beam splitter
8 Front monitor
10 Light detector

BEST MODE FOR CARRYING OUT THE INVENTION

Hereinafter, embodiments of the present invention will be described with reference to the drawings. In the description of the embodiments of the present invention, light output by a light source and a luminous flux advancing on the optical path will be referred to as a "light beam". In the figures, a plurality of optical paths are drawn as being offset from each other like in the conventional art, but this is merely for easier understanding of the present invention. In actuality, these optical paths exist at substantially the center of the optical parts including the lenses, waveplates, beam splitters, and the like.

Embodiment 1

FIG. 1 shows an optical pickup apparatus 100 according to this embodiment of the present invention. The optical pickup apparatus 100 writes information on an optical disc medium 6 by a laser beam output by a light source 1, or reads information recorded on the optical disc medium 6 by the laser beam output by the light source 1. The light source 1 is, for example, a semiconductor laser element. The optical disc medium 6 is, for example, a DVD or a CD. The DVD may be any of, for example, DVD-ROM, DVD-RAM, DVD-RW, DVD+RW, DVD-R, and DVD+R discs. The CD may be any of, for example, CD-ROM, CD-RW, and CD-R discs. The optical pickup apparatus 100 can record or reproduce information on or from both a DVD and a CD.

The optical pickup apparatus 100 includes a light intensity control device 100a, a collimator lens 3, a ¼ waveplate 4, and an objective lens 5. The light intensity control device 100a may be occasionally referred to as the "hybrid".

The light intensity control device 100a includes the light source 1 for outputting a light beam, PBSs (polarizing beam splitters) 2 and 7 for separating the light beam, a light receiving element 8 and a light detector 10 for receiving the light beam, a multi-lens 9, and a control section 11 for controlling the intensity of the light beam.

The light source outputs a plurality of types of light beams having different wavelengths. The light source 1 includes two active layers 1a and 1b for outputting two light beams having different wavelengths. The first active layer 1a outputs, for example, a light beam 21 having a wavelength of 650 nm for DVDs (hereinafter, referred to as the "DVD wavelength"), and the second active layer 1b outputs, for example, a light beam 22 having a wavelength of 780 nm for CDs (hereinafter, referred to as the "CD wavelength"). The light beams 21 and 22 output by the light source 1 reach the PBS 2. The plurality of types of light beams are output separately in accordance with the type of the optical disc medium, but may be output at the same time depending on the operation.

The PBS 2 separates each of the light beams 21 and 22 to a component directed toward the collimator lens 3 and a component directed toward the PBS 7. The PBS 2 transmits a majority (e.g., 90%) of a P-wave component of the light beam 21 incident thereon for DVDs and a part (e.g., 10%) of an S-wave component thereof, and reflects a part (e.g., 10%) of the P-wave component and a majority (e.g., 90%) of the S-wave component by a polarization separation face 2a. The PBS 2 also transmits a majority (e.g., 90% each) of both of a P-wave component and an S-wave component of the light beam 22 incident thereon for CDs, and reflects a part (e.g., 10% each) of both of the P-wave component and the S-wave component thereof by the polarization separation face 2a. The P-wave component and the S-wave component are also referred to as a "P polarization component" and an "S polarization component", respectively. The S-wave component is light having a polarization direction perpendicular to the P polarization direction. The light beam transmitted through the PBS 2 is directed to the collimator lens 3, and the light beam reflected by the polarization separation face 2a is directed to the PBS 7. The polarization direction of the light beam reflected by the polarization separation face 2a is approximately perpendicular to the polarization direction of the light transmitted through the PBS 2.

The light beam 21 or 22 transmitted through the PBS 2 is made parallel by the collimator lens 3 and reaches the ¼ waveplate 4. The ¼ waveplate 4 converts the linear polarization of the light beam 21, passing therethrough and having the DVD wavelength, into circular polarization. The light beam 21 or 22 which is passed through the ¼ waveplate 4 is collected by the objective lens 5, is transmitted through a substrate of the optical disc medium 6, forms a light spot on an information layer of the optical disc medium 6, and is reflected by the information layer. An optical path described above from the light source up to the information layer is referred to as a "forward path", and an optical path of the light reflected by the information layer and reaching the optical detector as described below is referred to as a "return path". The light beam reflected by the information layer of the optical disc medium 6 passes through the substrate, the objective lens 5, the ¼ waveplate 4 and the collimator lens 3, and returns to the PBS 2. The ¼ waveplate 4 converts the circular polarization of the reflected light beam 21 having the DVD wavelength into linear polarization. The PBS 2 reflects the light beam on the return path by the polarization separation face 2a, and the reflected light beam passes through the multi-lens 9 and reaches a light receiving face of the light detector 10. The light detector 10 converts the received reflected light into an electric signal in accordance with the intensity of the reflected light.

In a direction in which the light beam output by the light source 1 and reflected by the polarization separation face 2a of the PBS 2 is directed, the PBS 7 is provided. The PBS 7 is provided between the light source 1 and the light receiving element 8 on the optical path. The PBS 7 has a polarization separation face 7a, which is directed to receive the light beam reflected by the PBS 2. The light beam reflected by the PBS 2 is incident on the polarization separation face 7a. On the PBS 7, the light beam is directly incident from the light source 1 via the PBS 2, and the incident light beam is used to control the intensity of the light beam, which is to be output by the light source 1. Therefore, the light beam incident on the PBS 7 is referred to as "front monitoring light", a "light beam for front monitoring" or the like.

The PBS 7 guides both the P-wave component 22p and the S-wave component 22s of the light beam 22 having the CD wavelength to the light receiving element 8. The PBS 7 also guides the P-wave component 21p of the light beam 21 having the DVD wavelength to the light receiving element 8, but reflects the S-wave component 21s of the light beam 21 by the polarization separation face 7a and suppresses the S-wave component 21s from advancing toward the light receiving element 8. The ratio of the P-wave component 22p guided to the light receiving element 8 by the PBS 7 with respect to the entire P-wave component 22p incident on the PBS 7, and the ratio of the S-wave component 22s guided to the light receiving element 8 by the PBS 7 with respect to the entire S-wave component 22s incident on the PBS 7, are the same. The ratio of the S-wave component 21s guided to the light receiving element 8 by the PBS 7 with respect to the entire S-wave component 21s incident on the PBS 7 is lower than the ratio of the P-wave component 21p guided to the light receiving element 8 by the PBS 7 with respect to the entire P-wave component 21p incident on the PBS 7. For example, the PBS 7 passes approximately 100% of the P-wave component 21p so as to be guided to the light receiving element 8, whereas reflects approximately 100% of the S-wave component 21s by the polarization separation face 7a so as not to be guided to the light receiving element 8. The PBS 7 passes approximately 100% of both of the P-wave component 22p and the S-wave component 22s so as to be guided to the light receiving element 8. Namely, approximately 0% of the P-wave component 21p having the DVD wavelength is reflected, and approximately 0% of the S-wave component 21s having the DVD wavelength is passed. Approximately 0% of the P-wave component 22p having the CD wavelength is reflected, and approximately 0% of the S-wave component 22s having the CD wavelength is reflected.

In a direction in which the light beam passed through the PBS 7 is directed, the light receiving element 8 is provided such that a light receiving face thereof is perpendicular to the light beam incident thereon (hereinafter, the light receiving element 8 will be referred to as the "front monitor 8"). The front monitor 8 converts the received light beam into an electric signal (front monitor signal) in accordance with the intensity of the light beam. The control section 11 controls the intensity of the light beam, which is to be output by the light source 1, in accordance with the front monitor signal output by the front monitor 8. The control section 11 decreases the intensity of the light beam when the front monitor signal is higher than a reference value, whereas increases the intensity of the light beam when the front monitor signal is lower than the reference value. The PBS 7 and the front monitor 8 form an optical system of the light intensity control device 100a.

The elements of the light intensity control device 100a form a polarization optical system when an optical beam having the DVD wavelength is used, and form a non-polarization optical system when an optical beam having the CD wavelength is used. The P-wave component 21p having the DVD wavelength, and the P-wave component 22p and the S-wave component 22s having the CD wavelength, are incident on the front monitor 8, and thus a front monitor signal is generated. Owing to this arrangement, the intensity of the light beam output from the objective lens 5 can be stably controlled even when the polarization angle and/or the polarization ratio of the light beams having the DVD wavelength and the CD wavelength is changed due to temperature characteristics of the light source 1. The principle for this will be described in detail with reference to FIGS. 2A through 4B.

Figure 2A:
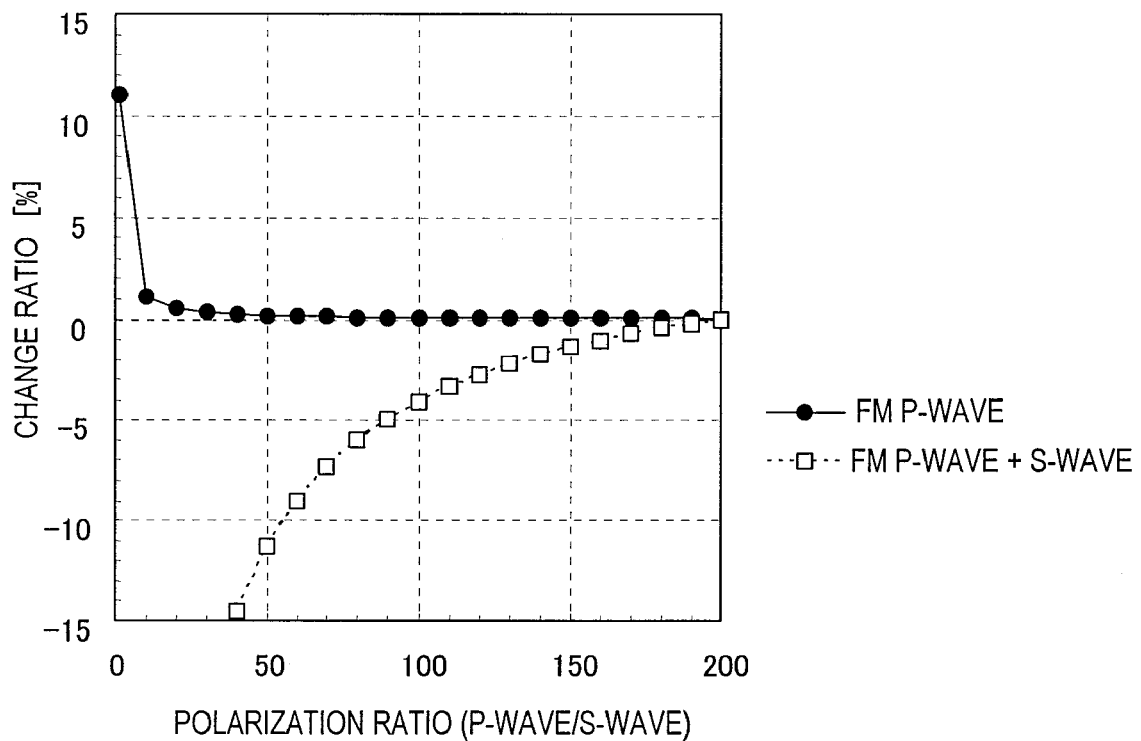
FIG. 2A shows the relationship between the polarization ratio and the change ratio according to the embodiment of the present invention.
Figure 2B:
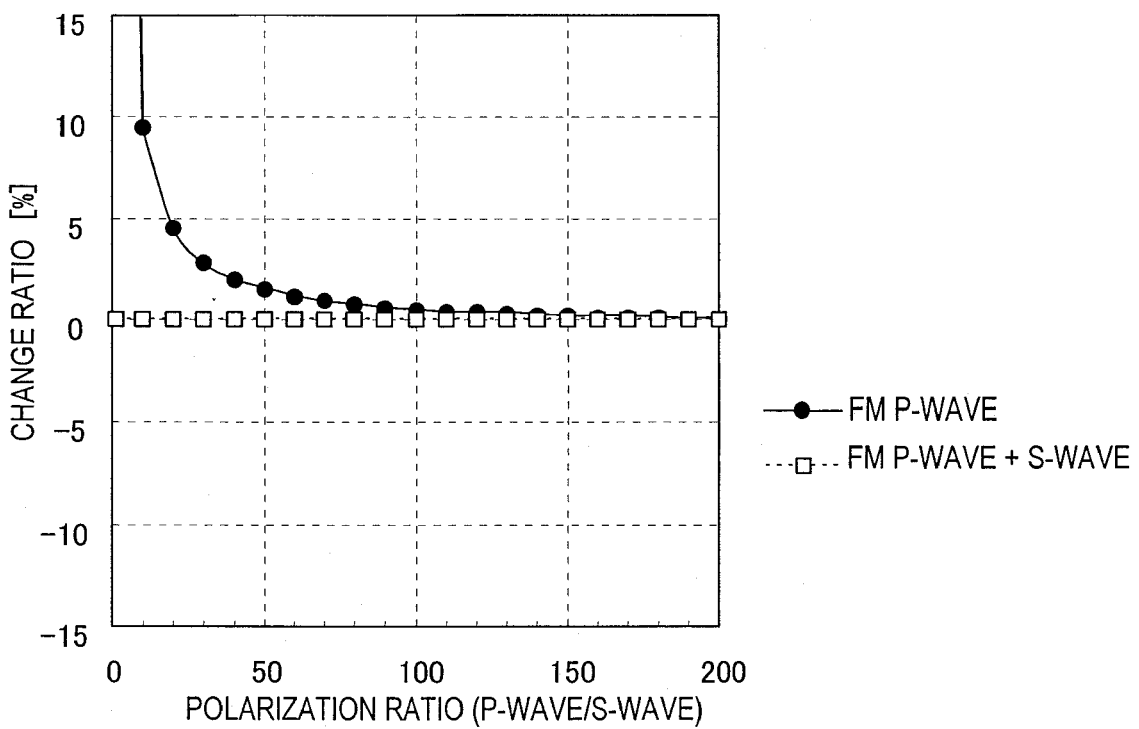
FIG. 2B shows the relationship between the polarization ratio and the change ratio according to the embodiment of the present invention.
Figure 3A:
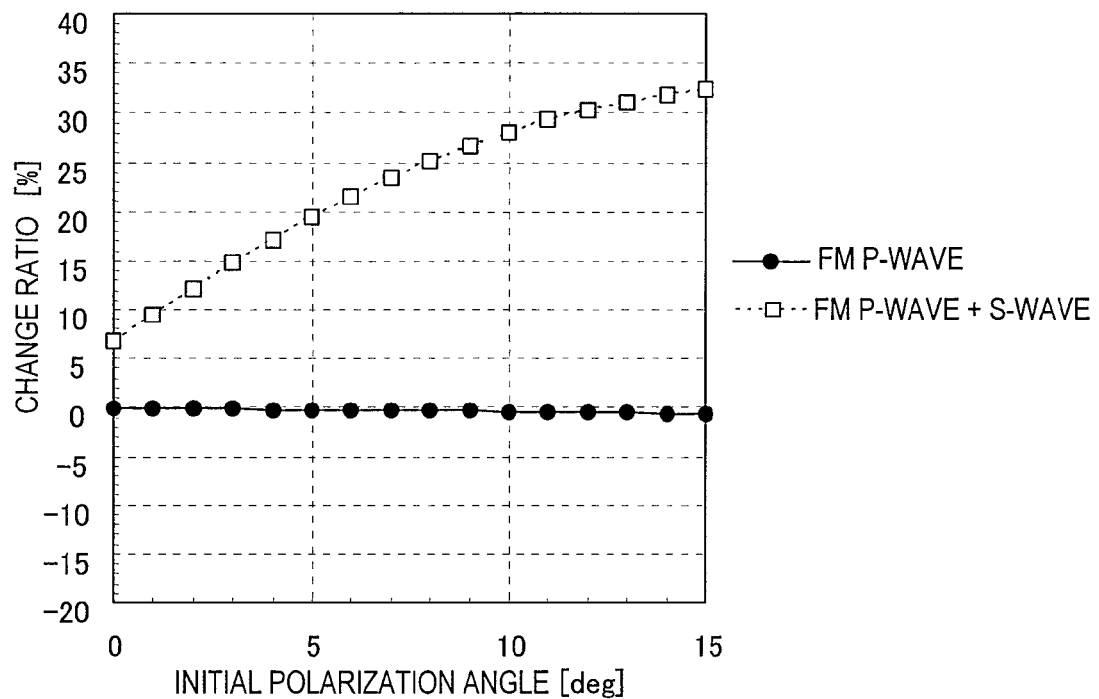
FIG. 3A shows the change ratio when the initial polarization angle is changed by a predetermined degree, according to the embodiment of the present invention.
Figure 3B:
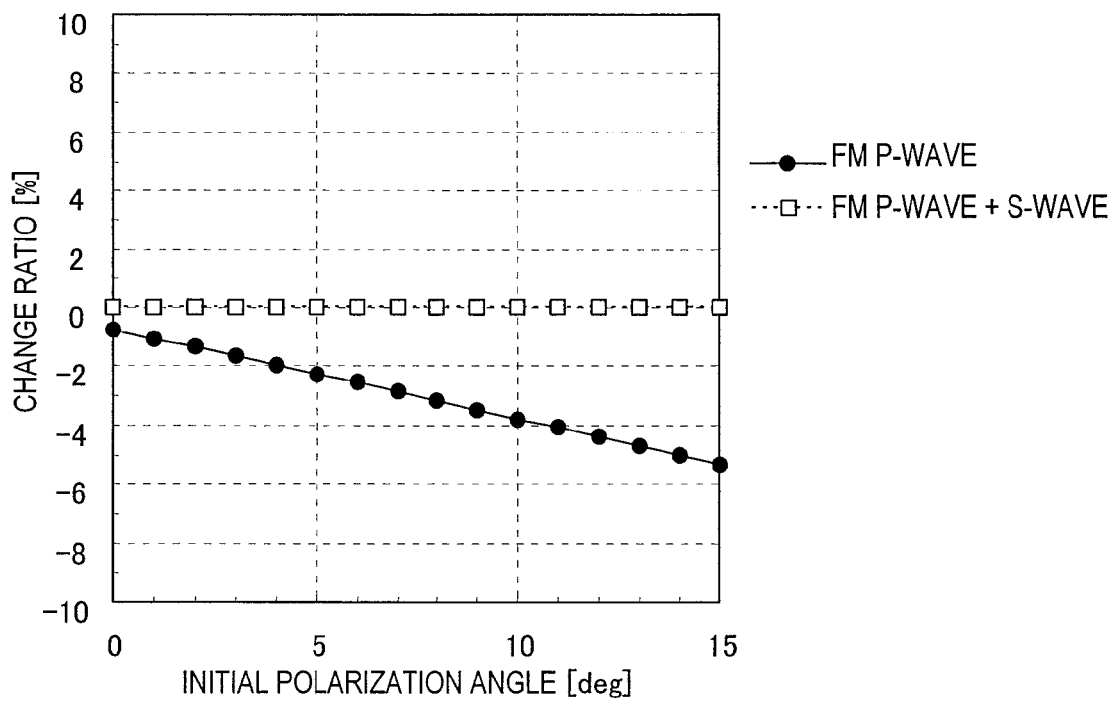
FIG. 3B shows the change ratio when the initial polarization angle is changed by a predetermined degree, according to the embodiment of the present invention.
Figure 4A:
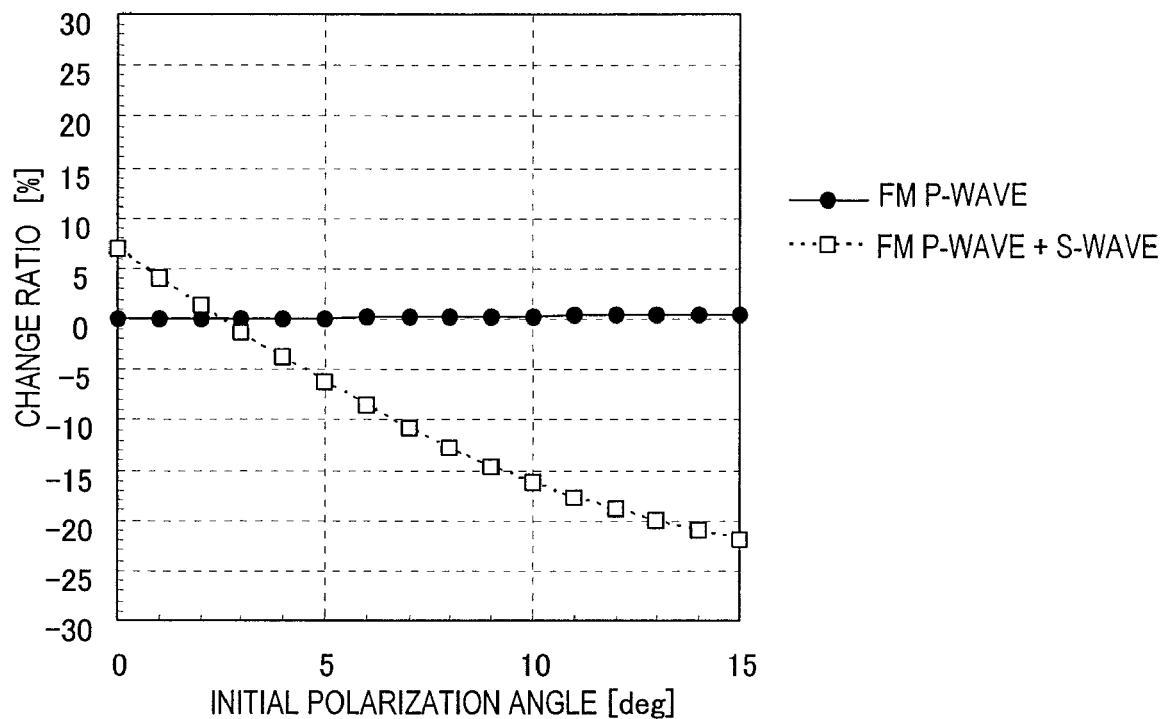
FIG. 4A shows the change ratio when the initial polarization angle is changed by a predetermined degree, according to the embodiment of the present invention.
Figure 4B:
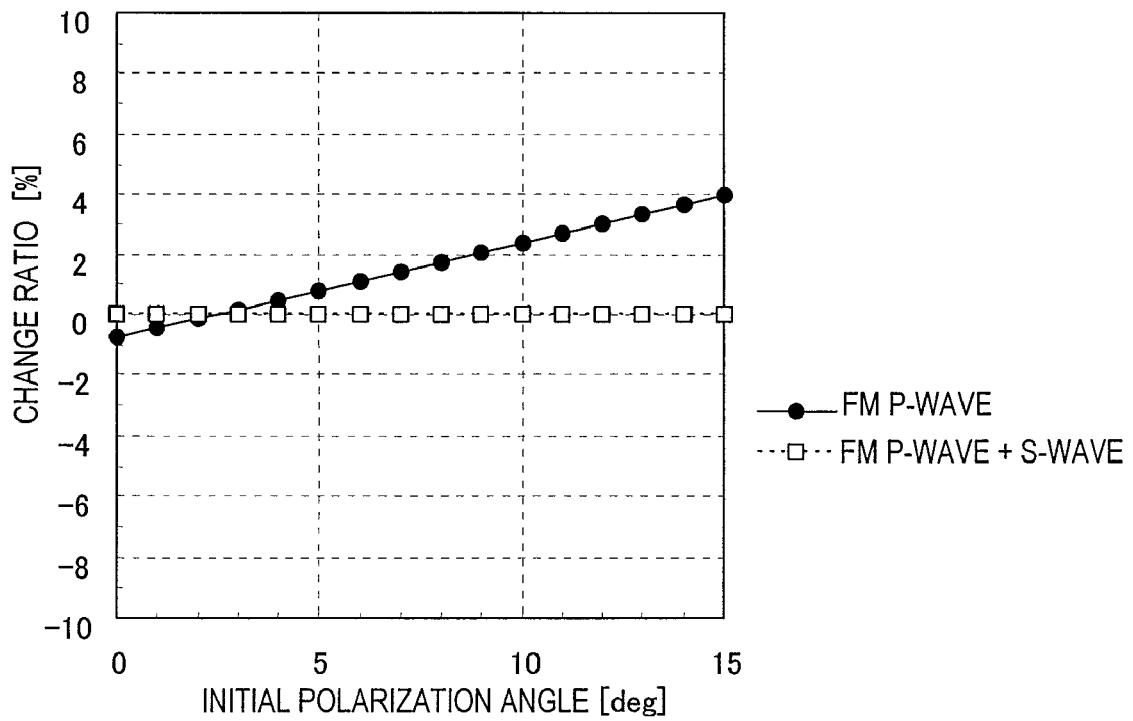
FIG. 4B shows the change ratio when the initial polarization angle is changed by a predetermined degree, according to the embodiment of the present invention.

FIG. 2A is a graph showing the following relationship when the polarization ratio between the P-wave component and the S-wave component is changed from an arbitrary initial value to 200 in the polarization optical system: the relationship between the polarization ratio and the change ratio of the front monitoring light amount. FIG. 2B is a graph showing the following relationship when the polarization ratio between the P-wave component and the S-wave component is changed from an arbitrary initial value to 200 in the non-polarization optical system: the relationship between the polarization ratio and the change ratio of the front monitoring light amount. FIG. 3A is a graph showing the following relationship when the polarization angle is changed from an arbitrary initial value by +5 degrees in the polarization optical system: the relationship between the initial polarization angle and the change ratio of the front monitoring light amount. FIG. 3B is a graph showing the following relationship when the polarization angle is changed from an arbitrary initial value by +5 degrees in the non-polarization optical system: the relationship between the initial polarization angle and the change ratio of the front monitoring light amount. FIG. 4A is a graph showing the following relationship when the polarization angle is changed from an arbitrary initial value by −5 degrees in the polarization optical system: the relationship between the initial polarization angle and the change ratio of the front monitoring light amount. FIG. 4B is a graph showing the following relationship when the polarization angle is changed from an arbitrary initial value by −5 degrees in the non-polarization optical system: the relationship between the initial polarization angle and the change ratio of the front monitoring light amount. In each of FIGS. 2A through 4B, the ● line (solid line) indicates the above relationship when the front monitoring light amount (FM) is detected from the P-wave component. The □ line (dashed line) indicates the above relationship when the front monitoring light amount (FM) is detected from the sum of the P-wave component and the S-wave component.

The front monitoring light amount is normalized based on the light amount output from the objective lens, and the change ratio with that value is calculated. Where the amount of light incident on the front monitor 8 with an initial polarization ratio value of X is Ax, and the amount of light incident on the front monitor with a polarization ratio of 200 is Ay, the change ratio is defined as: change ratio=(Ay−Ax)/Ax. Where the amount of light incident on the front monitor with an initial polarization angle value of X is Ax, and the amount of light incident on the front monitor with a polarization angle of X+5 degrees (or a polarization angle of X−5 degrees) is Az, the change ratio is defined as: change ratio=(Az−Ax)/Ax.

Referring to FIGS. 2A and 2B, in the polarization optical system, where the front monitoring light amount is detected from the P-wave component, the effect of suppressing the change ratio is very good. In the non-polarization optical system, where the front monitoring light amount is detected from the sum of the P-wave component and the S-wave component, the effect of suppressing the change ratio is very good. Namely, by detecting the front monitoring light amount from only the P-wave component in the polarization optical system (DVD) and by detecting the front monitoring light amount from the sum of the P-wave component and the S-wave component in the non-polarization optical system (CD), the change ratio of the front monitoring light amount against the change in the polarization ratio between the P-wave component and the S-wave component can be stabilized. Thus, the precision of the light intensity control on the light source 1 can be significantly improved.

Referring to FIGS. 3A and 4A, it is understood that also regarding the correlation between the polarization angle and the change ratio, a much higher effect of suppressing the change ratio in the polarization optical system is obtained by detecting the front monitoring light amount from the P-wave component than by detecting the front monitoring light amount from the sum of the P-wave component and the S-wave component. Referring to FIGS. 3B and 4B, it is understood that a much higher effect of suppressing the change ratio in the non-polarization optical system is obtained by detecting the front monitoring light amount from the sum of the P-wave component and the S-wave component than by detecting the front monitoring light amount from the P-wave component. Namely, by detecting the front monitoring light amount from only the P-wave component in the polarization optical system (DVD) and by detecting the front monitoring light amount from the sum of the P-wave component and the S-wave component in the non-polarization optical system (CD), the change ratio of the front monitoring light amount against the change in the polarization angle can be stabilized. Thus, the precision of the light intensity control on the light source 1 can be significantly improved.

Figure 5A:
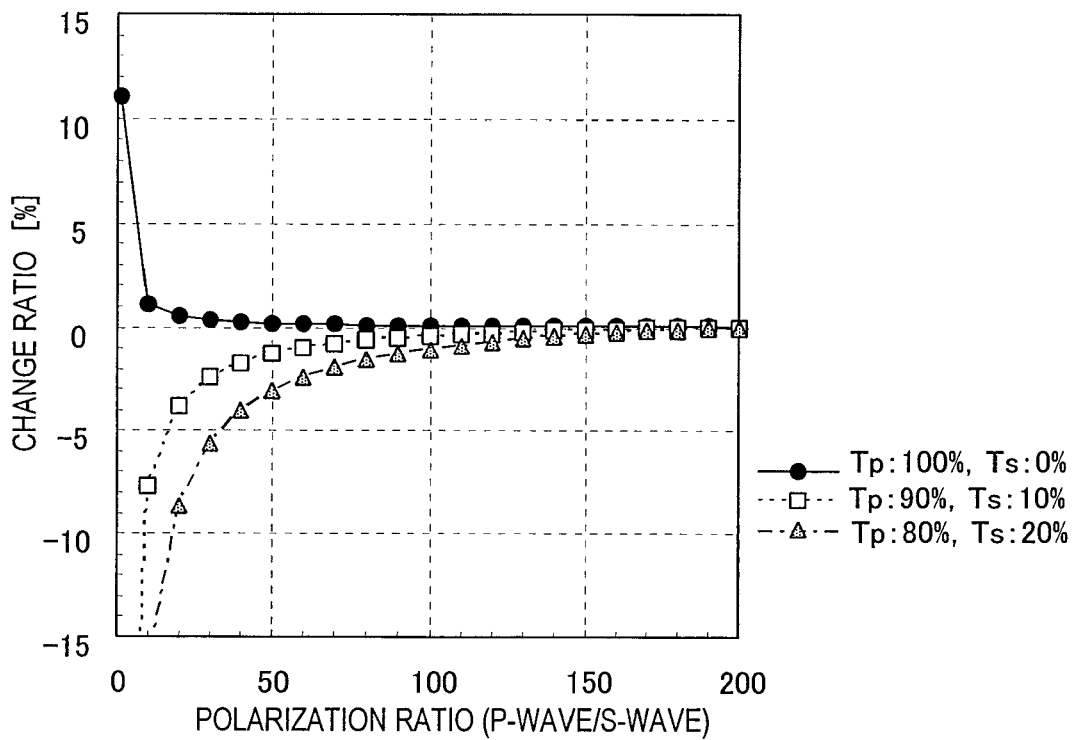
FIG. 5A shows the relationship between the polarization ratio and the change ratio according to the embodiment of the present invention.
Figure 5B:
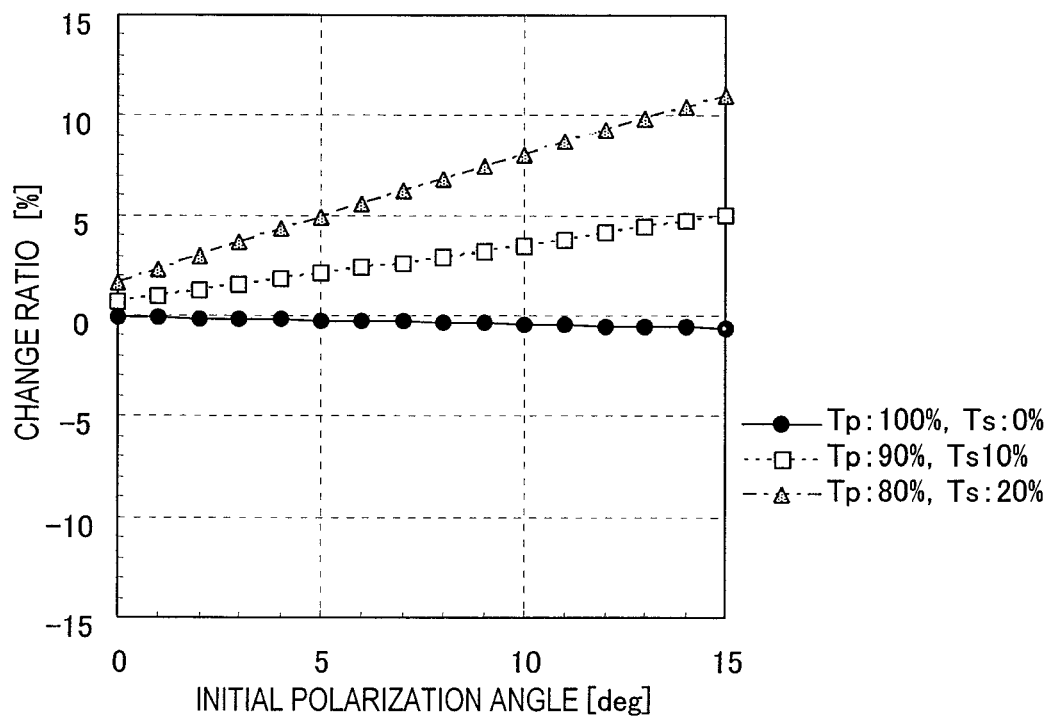
FIG. 5B shows the change ratio when the polarization angle is changed from an initial value by a predetermined degree, according to the embodiment of the present invention.
Figure 5C:
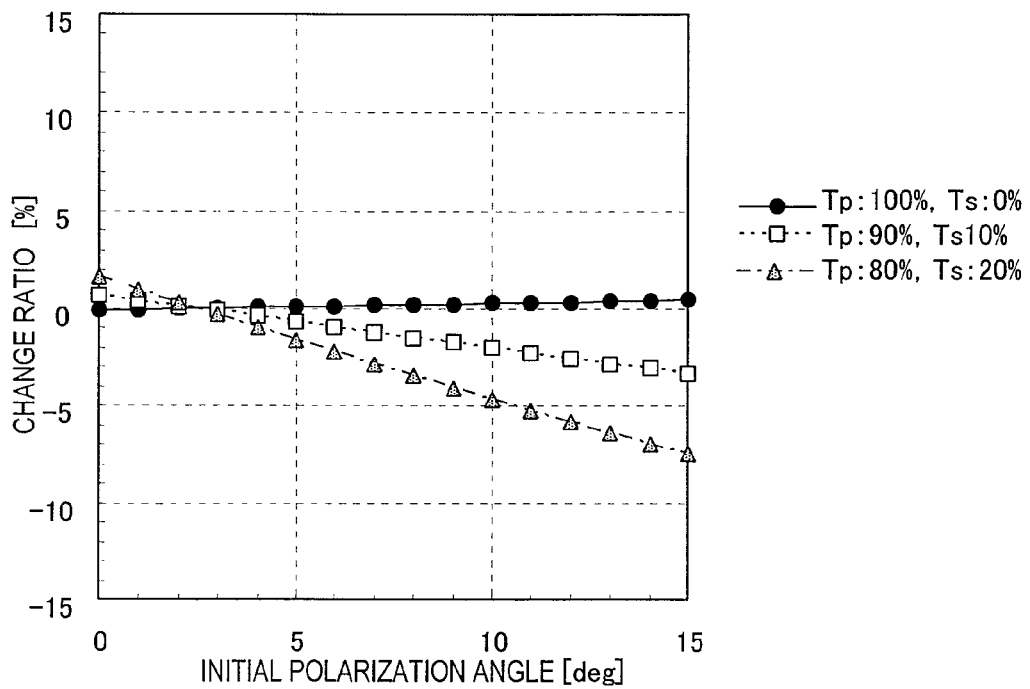
FIG. 5C shows the change ratio when the polarization angle is changed from an initial value by a predetermined degree, according to the embodiment of the present invention.

Now, with reference to FIGS. 5A through 5C, preferable values of the transmittance Tp of the P-wave component and the transmittance Ts of the S-wave component through the PBS 7 in the polarization optical system will be described. FIG. 5A is a graph showing the relationship between the polarization ratio and the change ratio of the front monitoring light amount when the polarization ratio is changed from an arbitrary initial value to 200 in the polarization optical system. FIG. 5B is a graph showing the relationship between the initial polarization angle and the change ratio of the front monitoring light amount when the polarization angle is changed from an arbitrary initial value by +5 degrees in the polarization optical system. FIG. 5C is a graph showing the relationship between the initial polarization angle and the change ratio of the front monitoring light amount when the polarization angle is changed from an arbitrary initial value by −5 degrees in the polarization optical system. As the laser diode characteristics of the light source 1, the polarization ratio is set to be 30 or greater, and the polarization angle is set to be within ±10 degrees. From FIGS. 5A through 5C, it is understood that as long as the transmittance Tp of the P-wave component through the PBS 7 is 90% and the transmittance Ts of the S-wave component through the PBS 7 is 10%, the change ratio can be suppressed to within ±3%. Namely, the transmittance Tp of the P-wave component is preferably 90% or greater (90 to 100%), and the transmittance Ts of the S-wave component is preferably 10% or less (0 to 10%).

Embodiment 2

Figure 6:
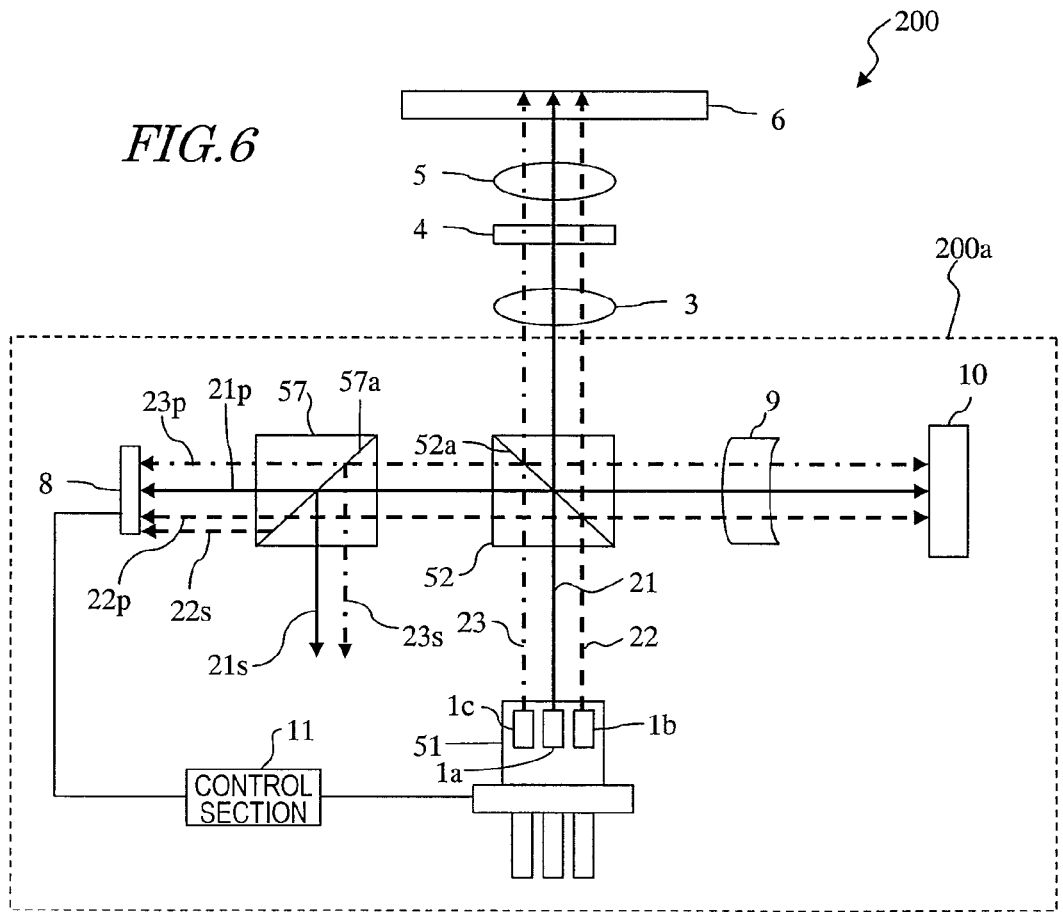
FIG. 6 shows an optical pickup apparatus according to an embodiment of the present invention.

FIG. 6 shows an optical pickup apparatus 200 according to this embodiment of the present invention.

The optical pickup apparatus 200 includes a light intensity control device 200a instead of the light intensity control device 100a of the optical pickup apparatus 100. The light intensity control device 200a includes a light source 51 and PBSs 52 and 57 instead of the light source 1 and the PBSs 2 and 7.

The light source 51 includes a third active layer 1c in addition to the first active layer 1a and the second active layer 1b. The first active layer 1a outputs, for example, a light beam 21 having the DVD wavelength of 650 nm, and the second active layer 1b outputs, for example, a light beam 22 having the CD wavelength of 780 nm. The third active layer 1c outputs, for example, a light beam 23 having a wavelength of 405 nm. Where the optical disc medium 6 is an optical disc medium used for performing information recording or reproduction using blue-violet laser light such as a BD (Blu-ray Disc) or the like, the light beam 23 is used. Hereinafter, the wavelength of 405 nm will be referred to as the "BD wavelength". Among the CD wavelength, the DVD wavelength and the BD wavelength, the CD wavelength is the longest and the BD wavelength is the shortest.

The PBSs 52 and 57 have a function of separating the light beam 23 having the BD wavelength, in addition to the functions of the PBSs 2 and 7. The PBS 52 transmits a majority (e.g., 90% each) of P-wave components of the light beams having the DVD wavelength and the BD wavelength and a part (e.g., 10% each) of S-wave components of the light beams having the DVD wavelength and the BD wavelength. The PBS 52 reflects, by a polarization separation face 52a thereof, a part (e.g., 10% each) of the P-wave components of the light beams having the DVD wavelength and the BD wavelength and a majority (e.g., 90% each) of the S-wave components of the light beams having the DVD wavelength and the BD wavelength. The PBS 52 transmits a majority (e.g., 90% each) of a P-wave component and an S-wave component of the light beam having the CD wavelength, and reflects a part (e.g., 10% each) of the P-wave component and the S-wave component of the light beam having the CD wavelength. The polarization direction of the light beam reflected by the PBS 52 is approximately perpendicular to the polarization direction of the light transmitted through the PBS 52.

The light beam transmitted through the PBS 52 is made parallel by the collimator lens 3 and reaches the ¼ waveplate 4. The ¼ waveplate 4 converts the linear polarization of the light beam, passing therethrough and having the DVD wavelength or the BD wavelength, into circular polarization. The light beam 21, 22 or 23 which is passed through the ¼ waveplate 4 is collected by the objective lens 5, is transmitted through a substrate of the optical disc medium 6, forms a light spot on an information layer of the optical disc medium 6, and is reflected by the information layer. The light beam reflected by the information layer of the optical disc medium 6 passes through the substrate, the objective lens 5, the ¼ waveplate 4 and the collimator lens 3, and returns to the PBS 52. The ¼ waveplate 4 converts the circular polarization of the reflected light beam 21 having the DVD wavelength or the BD wavelength into linear polarization. The PBS 2 reflects the light beam on the return path by the polarization separation face 52a, and the reflected light beam passes through the multi-lens 9 and reaches a light receiving face of the light detector 10.

In a direction in which the light beam output by the light source 51 and reflected by the PBS 2 is directed, the PBS 57 is provided. The PBS 57 has a polarization separation face 57a, which is directed to receive the light beam output by the light source 51 and reflected by the PBS 52. The light beam reflected by the PBS 52 is incident on the polarization separation face 57a.

The PBS 57 passes approximately 100% of the P-wave component 21p or 23p of the light beam incident thereon having the DVD wavelength or the BD wavelength, so as to be guided to the light receiving element 8. The PBS 57 reflects approximately 100% of the S-wave component 21s or 23s of the light beam incident thereon having the DVD wavelength or the BD wavelength by the polarization separation face 52a, so as not to be guided to the light receiving element 8. The PBS 57 passes approximately 100% of both of the P-wave component 22p and the S-wave component 22s of the light beam having the CD wavelength, so as to be guided to the light receiving element 8. Namely, approximately 0% of the P-wave component having the DVD wavelength or the BD wavelength is reflected, and approximately 0% of the S-wave component having the DVD wavelength or the BD wavelength is passed. Approximately 0% of both of the P-wave component and the S-wave component having the CD wavelength is reflected.

In a direction in which the light beam passed through the PBS 57 is directed, the front monitor 8 is provided such that a light receiving face thereof is perpendicular to the light beam incident thereon. The front monitor 8 converts the received light beam into a front monitor signal in accordance with the intensity of the light beam. The PBS 57 and the front monitor 8 form an optical system of the light intensity control device 200a.

The elements of the light intensity control device 200a form a polarization optical system when an optical beam having the DVD wavelength or the BD wavelength is used, and form a non-polarization optical system when an optical beam having the CD wavelength is used. The P-polarization component having the DVD wavelength or the BD wavelength, and the P-polarization component and the S-polarization component having the CD wavelength, are incident on the front monitor 8, and thus a front monitor signal is generated. Owing to this arrangement, the intensity of the light beam output from the objective lens 5 can be stably controlled even when the polarization angle and/or the polarization ratio of the light beams having the DVD wavelength, the BD wavelength and the CD wavelength is changed due to temperature characteristics of the light source 51, like in the light intensity control device 100a.

An HD-DVD used for performing information recording or reproduction using blue-violet laser light having the BD wavelength has the same substrate thickness as that of a DVD. Therefore, the birefringence caused by the substrate of the HD-DVD is about the same as that caused by the substrate of the DVD. For this reason, the present invention provides substantially the same effect as described above even when being applied to an HD-DVD system. A Blu-ray disc has a still thinner substrate thickness of 0.1 mm, and is less influenced by the birefringence. Hence, the effect of the present invention for the Blu-ray disc is more conspicuous.

As described above, the optical pickup apparatus 200 can significantly improve the precision of the light intensity control on the light source 51 for outputting light beams of three wavelengths corresponding to three types of discs of CD, DVD and BD.

Embodiment 3

Figure 7:
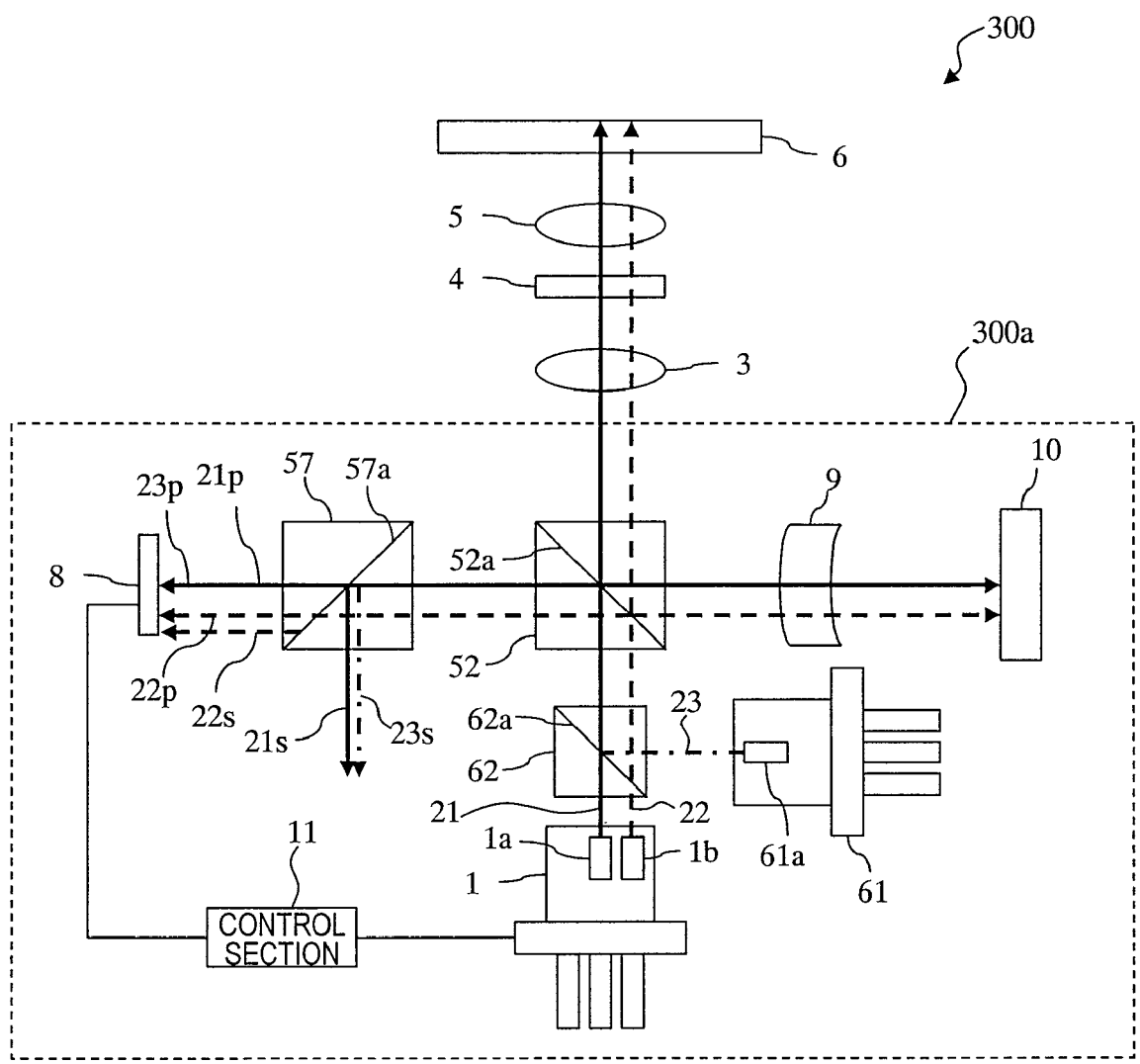
FIG. 7 shows an optical pickup apparatus according to an embodiment of the present invention.
Figure 8:
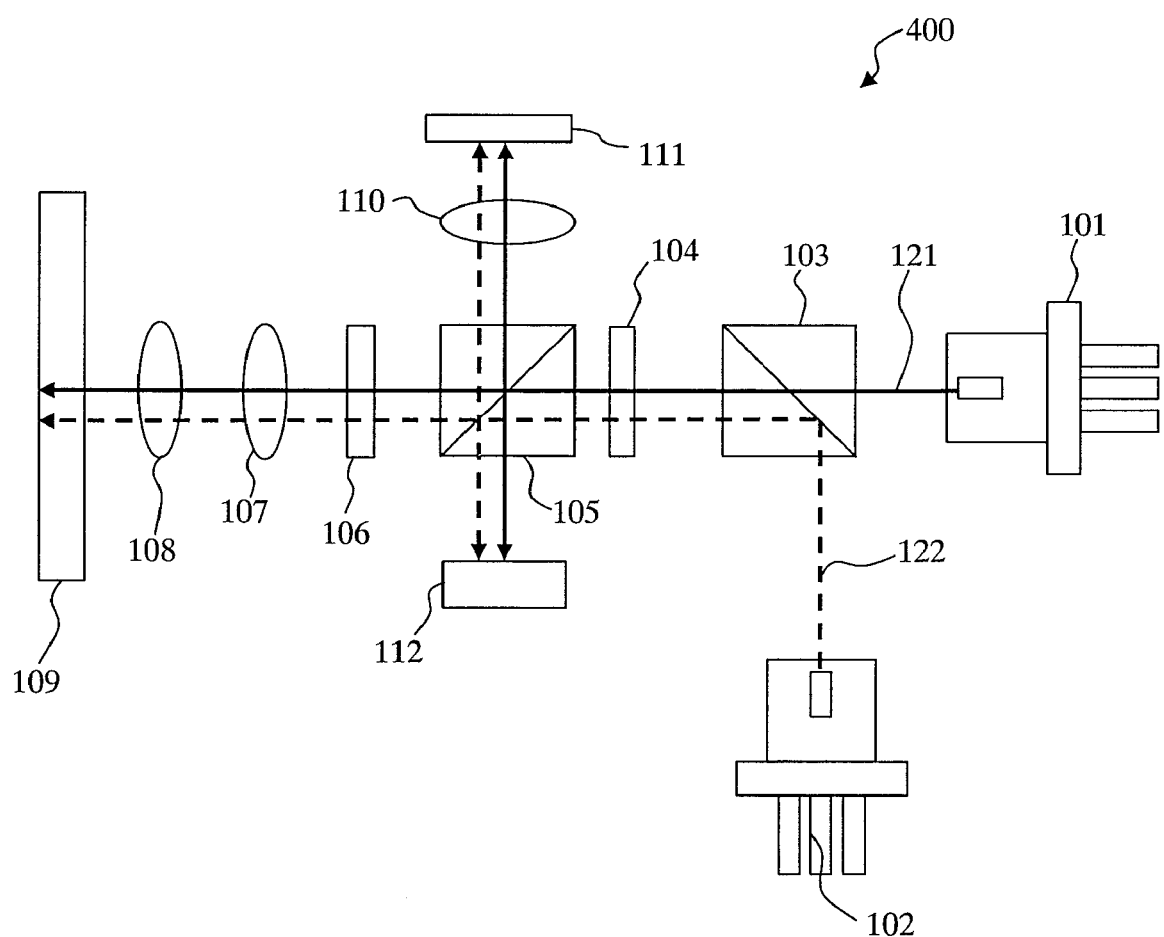
FIG. 8 shows a conventional optical pickup apparatus.
Figure 9:
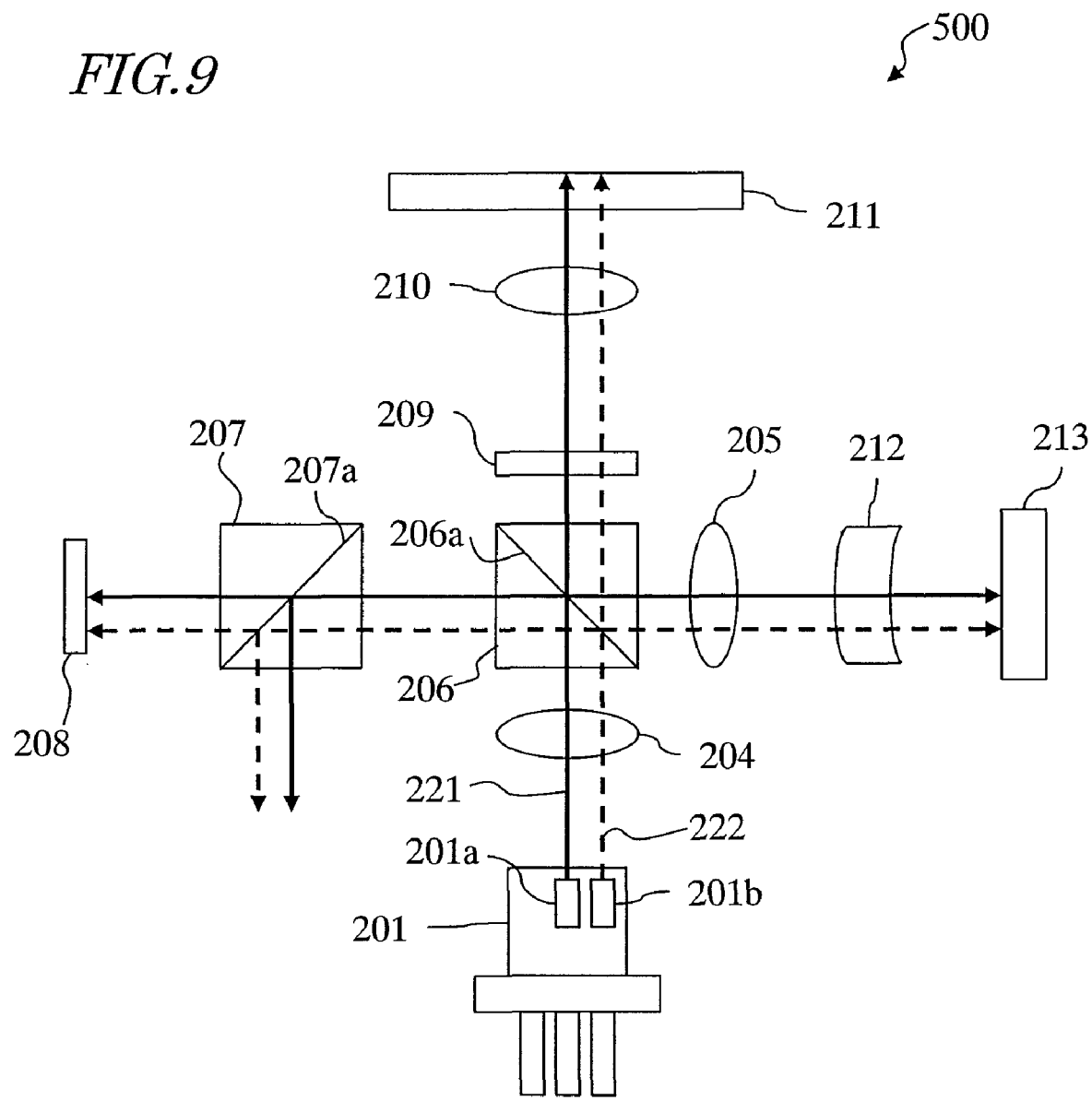
FIG. 9 shows a conventional optical pickup apparatus.

FIG. 7 shows an optical pickup apparatus 300 according to this embodiment of the present invention.

The optical pickup apparatus 300 includes a light intensity control device 300a instead of the light intensity control device 200a of the optical pickup apparatus 200. The light intensity control device 300a includes light sources 1 and 61 and a PBS 62 instead of the light source 51.

The light source 1 includes the first active layer 1a and the second active layer 1b, and the light source 61 includes a third active layer 61a for outputting laser light having the BD wavelength. The PBS 62 is an optical element for guiding, to the PBS 52, the laser light 21 having the DVD wavelength and the laser light 22 having the CD wavelength which are output by the light source 1 and the laser light 23 having the BD wavelength which is output by the light source 61.

A polarization separation face 62a of the PBS 62 completely transmits the light beam 21 having the DVD wavelength and the light beam 22 having the CD wavelength, and completely reflects the light beam 23 having the BD wavelength. The operation of the light intensity control device 300a after this is substantially the same as that of the light intensity control device 200a. Thus, the intensity of all of the light beam 21 having the DVD wavelength and the light beam 22 having the CD wavelength which are output by the light source 1 and the light beam 23 having the BD wavelength which is output by the light source 61 can be controlled with high precision. The light intensity control device 300a is slightly larger due to the two light sources. However, a semiconductor laser device accommodating the first through third active layers in one package has just been developed. Therefore, currently, the light intensity control device 300a including two light sources is considered to be superior in reliability to the light intensity control device 200a.

INDUSTRIAL APPLICABILITY

The present invention is especially useful in the field of controlling the intensity of a light beam, and can realize, for example, an optical pickup apparatus for controlling the intensity of a light beam with high precision over a wide wavelength range.

The invention claimed is:
1. A light intensity control device, comprising:
a light source for outputting a plurality of types of light beams having different wavelengths;
a light receiving section for receiving the light beams and converting the light beams into an electric signal in accordance with an intensity of the respective light beam; and
a polarization separation section provided between the light source and the light receiving section;
wherein:
the plurality of types of light beams include a first light beam and a second light beam having a longer wavelength than that of the first light beam;
the polarization separation section guides both a light component in a first polarization direction of the second light beam and a light component in a second polarization direction, which is perpendicular to the first polarization direction, of the second light beam to the light receiving section; and
the polarization separation section guides a light component in a first polarization direction of the first light beam to the light receiving section, and suppresses a light component in a second polarization direction, which is perpendicular to the first polarization direction, of the first light beam from advancing to the light receiving section.

2. The light intensity control device of claim 1, wherein the ratio of the light component in the first polarization direction of the second light beam guided by the polarization separation section to the light receiving section with respect to the entire light component in the first polarization direction of the second light beam, and the ratio of the light component in the second polarization direction of the second light beam guided by the polarization separation section to the light receiving section with respect to the entire light component in the second polarization direction of the second light beam, are the same.

3. The light intensity control device of claim 2, wherein the ratio of the light component in the second polarization direction of the first light beam guided by the polarization separation section to the light receiving section with respect to the entire light component in the second polarization direction of the first light beam, is lower than the ratio of the light component in the first polarization direction of the first light beam guided by the polarization separation section to the light receiving section with respect to the entire light component in the first polarization direction of the first light beam.

4. The light intensity control device of claim 1, wherein the second light beam has the longest wavelength among the plurality of types of light beams.

5. The light intensity control device of claim 1, wherein the light components in the first polarization direction are P-wave components, and the light components in the second polarization direction are S-wave components.

6. The light intensity control device of claim 1, further comprising a light source for outputting a third light beam having a shorter wavelength than that of the first light beam; wherein:
wherein the polarization separation section guides a light component in a first polarization direction of the third light beam to the light receiving section, and suppresses a light component in a second polarization direction, which is perpendicular to the first polarization direction, of the third light beam from advancing to the light receiving section.

7. The light intensity control device of claim 1, further comprising a control section for controlling the intensity of the light beam, which is to be output by the light source, in accordance with the electric signal output by the light receiving section.

8. An optical pickup apparatus, comprising:
- a light intensity control device of claim 1;
- a light collection section for collecting the plurality of types of light beams to an information medium;
- another polarization separation section for separating the light beam output by the light source to light directed toward the light collection section and light directed to the polarization separation section; and
- another light receiving section for receiving the light reflected by the information medium and converting the reflected light into an electric signal in accordance with an intensity of the reflected light.

9. The optical pickup apparatus of claim 8, further comprising:
- another light source for outputting a third light beam having a shorter wavelength than that of the first light beam; and
- an optical element for guiding the first and second light beams output by the light source and the third light beam output by the another light source to the another polarization separation section;
- wherein the polarization separation section guides a light component in a first polarization direction of the third light beam to the light receiving section and suppresses a light component in a second polarization direction, which is perpendicular to the first polarization direction, of the third light beam from advancing to the light receiving section.

* * * * *